3,244,491
SLUDGE INHIBITED FUEL OIL COMPOSITIONS
Byron E. Marsh, Mount Vernon, and Donald J. Tucek, Berwyn, Ill., assignors to Armour and Company, Chicago, Ill., a corporation of Delaware
No Drawing. Filed Aug. 14, 1962, Ser. No. 216,729
10 Claims. (Cl. 44—66)

This application is a continuation-in-part of our copending application Serial No. 26,426, filed May 3, 1960, now abandoned.

This invention relates to improved fuel oil compositions. More particularly this invention relates to fuel oil compositions having improved sludge inhibiting and dispersing properties.

It is well known that hydrocarbon fuel oils, such as those used in burner systems, tanks, diesel and combustion engines and other industrial and domestic equipment, are subject to numerous short-comings due to chemical deterioration and impurities, either introduced or not removed in processing. This is particularly true of fuel oils which contain a substantial quantity of cracked components. Many oils tend to develop undesirable solids or sludge which deleteriously affect the usefulness of the oils, either by diminution of their combustive capacity or by their tendency to clog the filters present in the equipment being employed. The petroleum industry has attacked the problem of improving fuel oil compositions from several aspects. One is improved processing techniques; another is blending of oils; still a third, which is somewhat akin to the second, is the addition of chemical agents. This invention relates to the latter method of improving fuel oil compositions.

The search by the petroleum industry for chemical additives for fuel oils to improve their properties has been and continues to be a tedious and not too rewarding proposition. An important aspect of this search has been directed toward the development of fuel oil compositions capable of preventing or inhibiting the sludging and/or clogging tendencies generally exhibited by hydrocarbon distillate fuel oils.

The problem of screen clogging in fuel oil systems is common, particularly in domestic fuel oil systems employing distillate fuel oils. This condition is particularly aggravated when such fuels contain minor amounts of water dispersed therein.

Another place where screen clogging and plugging is encountered is in fuel oil storage tanks which may be connected to burner systems or engines, etc. The stored oil generally comes in contact with air, moisture, etc. which cause formation and precipitation of sludge materials, the latter depositing on and clogging the screens or filters used for protecting the burners or engines using such fuel oils. Still another problem encountered in this connection is the stirring-up or agitation of sludge deposits in fuel oil storage tanks when the latter are being filled. These slow-setting materials greatly shorten the life of screens and filters used in fuel oil systems.

We have discovered that salts of cyanoethylated amines are highly effective for dispersing sludge and contaminations in fuel oils, while at the same time having little or no tendency to form emulsification in fuel oils in which water may be present. A small amount of water is usually present in fuel tanks due to contamination or condensation, and it is important that the dispersant have the least tendency toward emulsification while at the same time having high effective power as a dispersant even when used in small amounts. Small amounts of salts of cyanoethylated amines bring about effective dispersing of the sludge so as to free the screens from clogging and to disperse any pre-formed sludge in the fuel oil body. We have discovered further that we may combine with the foregoing dispersant without reducing its dispersant power and without increasing the tendency toward emulsification, a group of chemicals which add a small increment with respect to dispersibility but which are highly effective in inhibiting the sludging and clogging tendencies of fuel oils. The latter group of chemicals includes aliphatic secondary amines and tertiary amines, and other fatty nitrogen derivatives which will be described more fully hereinafter.

Salts of cyanoethylated amines used in this invention may be obtained by methods well known in the art. For example, one process for obtaining salts of cyanoethylated amines is described in S. A. Heininger, Reactions of 3-Chloropropionitrile and Alkyl 3-Chloropropionitriles With Amines, Journal of Organic Chemistry, 22, 704–6 (1957).

A primary object, therefore, is to provide fuel oil compositions having improved sludge dispersant properties. Another object is to provide as an additive for fuel oil a dispersant chemical which is effective even when used in very small amounts for dispersing pre-formed sludge in the fuel oil body. A further object is to provide fuel oil compositions comprising fuel oil and salts of cyanoethylated amines to provide a fuel oil composition having high performance characteristics and providing substantial freedom from screen clogging tendencies. A still further object is to provide a fuel oil composition containing compatible chemicals for both inhibiting and dispersing sludge formation in hydrocarbon fuel oils while at the same time avoiding emulsification with water contained therein. A still further object is to provide additives for fuel oil to prevent the formation of sludge and to disperse any pre-formed sludge in the fuel oil body. A further object is to provide a distillate fuel oil composition which is effective in removing pre-formed sludge deposits in fuel oil systems. A further object of this invention is to provide a particular type of distillate fuel oil composition or a blend thereof which is non-corrosive, stable, and effective for inhibiting and dispersing sludge and other fuel oil contaminants.

One class of chemical compounds which can be used as additives, particularly as dispersants, in accordance with the present invention is selected from the group consisting of N-alkyl, -alkylaryl, -substituted alkyl, -substituted alkylaryl ammonium salts, N,N'-alkyl, -alkylaryl, -substituted alkyl, -substituted alkylaryl, alkyl substituted heterocyclic di-ammonium salts, and salts of cyanoethylated amines. The compounds of this group may be represented by the respective formulae

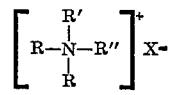

and

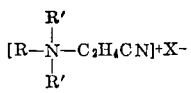

wherein R is an aliphatic hydrocarbon radical having from 8 to 22 carbon atoms, R' is selected from the group consisting of hydrogen, cyanoethyl, lower alkyl radicals having from 1 to 5 carbon atoms, and alkylaryl, R" is selected from the group consisting of lower alkyl radicals having from 1 to 5 carbon atoms, alkylaryl and aryl radicals, cyanoethyl radicals and radicals represented by the formula

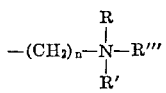

wherein R and R' are as defined above, R''' is selected from the group consisting of aliphatic hydrocarbon radicals having from 1 to 22 carbon atoms, alkylaryl radicals, aryl radicals, $n$ is an integer from 1 to 10, and X is an anion such as nitride, halogen sulfate, alkyl sulfate, oleate, palmitate, stearate, benzoate, organic and inorganic phosphate, etc.

Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, dodecenyl, and mixtures of hydrocarbon radicals as derived from tall oil, tallow, soybean oil, coconut oil, cottonseed oil, and other animal and vegetable oils. Examples of radicals coming within the definition of R' include methyl, ethyl, propyl, isopropyl, butyl, propargyl, dodecylbenzyl, and isobutyl. The anion in the above formulae, although having no apparent effect on the dispersant properties of the additive, greatly influences the solubility of the additive. Depending upon the degree of solubility desired, therefore, the choice of anion is quite broad.

Our preferred compounds are disoya dimethyl ammonium chloride, dihydrogenated tallow dimethyl ammonium chloride, N-tallow cyanoethyl amine oleate, N-tallow cyanoethyl amine palmitate and di-tallow mono-cyanoethyl-mono-methyl ammonium sulfate.

The above-described additives have excellent sludge dispersing properties and when employed in combination with a sludge inhibiting agent selected from the group of fatty nitrogen derivatives consisting of aliphatic secondary amines, aliphatic tertiary amines, di-aliphatic-beta amino-propion-aldehydes, aliphatic secondary amine-formaldehyde reaction products, diamines, and combinations thereof, an extremely stable and non-clogging fuel oil composition can be prepared.

These sludge inhibiting agents are commercially available under the trademark Armeen (aliphatic secondary and tertiary amines).

The quantity of these oil soluble, non-ash forming chemicals which can be added to the fuel oil in accordance with the present invention can vary within wide limits, depending upon the nature of the oil, especially those containing a substantial quantity of cracked components, and the use to which it is to be put. While the concentration of the added chemicals can be as low as about 10 parts per million in the case of the dispersants and 25 parts per million in the case of the inhibitors, and as high for each as 1 or 2 weight percent, we prefer, in the case of domestic fuel oils which are blends of cracked hydrocarbon fuels and straight fuels to add between 50 and about 100 parts per million of the combined chemical additives. The amount of the sludge inhibitor component may be less than, equal to or greater than the amount of the dispersing additive employed. Preferred formulations are set out in the examples. Our chemical additives are, in general, liquids and oil soluble and can be dissolved to provide the desired concentration of additive in the resulting fuel oil.

The hydrocarbon distillate fuel oils in which the active chemical ingredients of this invention are dispersed or dissolved can be treated or untreated cracked fuel oils or mixtures of cracked fuels with straight run fuel oils, said fuel oils having components normally distilling from about 300° F. to about 700° F. Preferred fuels have a boiling range of from about 340° F. to about 700° F. and particularly from about 400° F. to about 675° F. Specifically, hydrocarbon distillates which utilize bases in the compositions of this invention are cracked gas oils, fuel oils, furnace oils, burner oils, diesel fuel oils, kerosene, etc., and mixtures of said cracked fuels with the corresponding or like straight run hydrocarbon fractions.

The following example will help to illustrate the underlying principles of our invention and it is not intended to be unduly limiting thereof:

*Example I*

A variety of organic compounds were evaluated for dispersant properties according to Socony Mobil Method 530–57. A possible correlation between molecular structure and dispersing and emulsifying properties was investigated. These compounds varied in type and number of functional groups, degree of branching and unsaturation, chain length, and ionic properties.

The test used to evaluate the dispersibility of the chemicals was Soconoy Mobil Method 530–57. In this test, fuel oil containing a weighed amount of sludge is circulated by means of a fuel oil burner pump through a 100 mesh Monel strainer. The amount of sludge retained by the strainer is collected in a tared Gooch crucible and weighed.

Fifteen grams of a synthetic sludge are added to one gallon of mineral spirits along with a known concentration of additive and the mixture circulated through the system for two hours. The deposit of sludge using an additive is compared to that of a control. The results are recorded as percent reduction in screen deposit.

The synthetic sludge (a mixture of water, kerosene and lampblack) used, correlates well with tests run with actual sludge and has the advantage of uniformity. It is prepared by homogenizing to a mayonnaise consistency, 50% (by weight) of water, 40% of kerosene, and 10% of Eagle Brand Germantown Lampblack. Mineral spirits was substituted for fuel oil because of its higher degree of purity.

The emulsion test consists of vigorously shaking ten times a mixture of 80 cc. of inhibited mineral spirits and 20 cc. of distilled $H_2O$ in a stoppered graduate. The time required for both layers to break to a clean interface is recorded. Any haziness in the oil or water layer is noted. The test is repeated three or four times and the results noted.

Since in a fuel oil system there will usually be a small amount of water in the fuel tank due to contamination or condensation, the emulsifying tendency of the additive with water was investigated.

The compounds which were effective dispersants (reduction of 90% or more in screen deposit) and showed the least tendency toward emulsification in a fuel oil water system were added at their lowest effective concentration to an inhibitor additive (the Armolads) at its effective concentration and the combination evaluated.

TABLE I
EXPERIMENTAL DATA ON THE DISPERSANT AND EMULSIFICATION PROPERTIES OF DISPERSANT-INHIBITOR ADDITIVE COMBINATIONS

| | Inhibitor | Conc. (p.p.m.) | Dispersant | Conc. (p.p.m.) | Dispersibility, percent | Emulsification |
|---|---|---|---|---|---|---|
| 1. | Alpha-dimethyl-beta-dicoco amino propionaldehyde. | 50 | Arquad 2S (Disoya quaternary ammonium chloride). | 25 | 95 | Broke to a filmy interface in 5 min |
| 2. | Armeen 2T (Ditallow amine)-Methylol. | 50 | ...do... | 50 | 84 | Do. |
| 3. | 50% Duomeen T (N-tallow trimethylene diamine); 50% Armeen DMS (Dimethyl soya amine). | 50 | ...do... | 50 | 96 | Broke to a filmy interface in 15 min. |
| 4. | Armeen DMS (Dimethyl soya amine). | 50 | ...do... | 50 | 88 | Broke to a filmy interface in 5 min. |
| 5. | Duomeen C (N-coco trimethylene diamine). | 50 | ...do... | 50 | 93 | Emulsion did not break within 15 min. |
| 6. | Armeen 2C (Dicoco amine) | 75 | Arquad 2HT-T (Di-hydrogenated tallow quaternary ammonium chloride-technical). | 25 | 97 | Emulsion broke to a filmy interface within 15 min. |
| 7. | Alpha-dimethyl-beta-dicoco amino propionaldehyde. | 75 | ...do... | 25 | 93 | Emulsion did not break within 15 min. |
| 8. | Armeen 2T (Ditallow amine)-Methylol. | 75 | ...do... | 25 | 91 | Do. |
| 9. | Armeen DMS (Dimethyl soya amine). | 75 | ...do... | 25 | 95 | Do. |
| 10. | Duomeen C (N-coco trimethylene diamine). | 75 | ...do... | 25 | 93 | Do. |
| 11. | 50% Duomeen T (N-tallow trimethylene diamine); 50% Armeen DMS (Dimethyl soya amine). | 75 | ...do... | 25 | 91 | Emulsion broke to a filmy interface within 15 min. |
| 12. | Alpha-dimethyl-beta-dicoco amino propionaldehyde. | 50 | N-Tallow Cyanoethyl amine oleate. | 100 | 95 | Broke to clean interface in 5 min. |
| 13. | 50% Duomeen T (N-tallow trimethylene diamine); 50% Armeen DMS (Dimethyl soya amine). | 50 | ...do... | 100 | 93 | Emulsion did not break. |
| 14. | Armeen DMS (Dimethyl soya amine). | 50 | ...do... | 100 | 92 | Broke to a clean interface in 1 min. |
| 15. | Duomeen C (N-coco trimethylene diamine). | 50 | ...do... | 100 | 92 | Emulsion did not break. |

TABLE II
COMPARISON OF PROPERTIES OF QUATERNARY AMMONIUM SALTS HAVING DIFFERENT ANIONS

| Chemical | Conc. (p.p.m.) | Dispersibility, percent | Emulsification |
|---|---|---|---|
| Arquad 2S (Di-soya quaternary ammonium chloride). | 100 | 97 | No breaking within 15 min. |
| Arquad 2HT (di-hydrogenated tallow quaternary ammonium chloride). | 100 | 94 | Breaks within 15 min. |
| Do. | 50 | 94 | Do. |
| Do. | 25 | 90 | Do. |
| Dimethyl dioleyl ammonium hydroxide. | 100 | 96 | Do. |
| Dimethyl dioleyl ammonium oleate. | 100 | 92 | No breaking in 15 min. |
| Arquad 2HT nitrite (di-hydrogenated tallow quaternary ammonium nitrite). | 100 | 98 | No breaking within 15 min. |
| Dimethyl dicoco ammonium p-toluene sulfonate. | 100 | 98 | Breaks to clean interface in 3 min. |
| 2-cyanoethyldiocta-decylamine methyl sulfate quaternary. | 100 | 91 | Breaks in 3 min. slight filmy interface. |
| N-tallow cyanoethylamine oleate. | 100 | 94 | Clean interface in 3 min. |

The cyanoethylated diamines when combined with fuel oil, preferably in the proportion of about 50–100 parts per million parts of the fuel oil, not only give a great reduction in sludge but also accomplish this result with low concentrations and with little tendency to form emulsions. Best results have been obtained by employing a product in which R, as shown in the molecular structure set out in cols. 2 and 3 of the specification, is an aliphatic hydrocarbon having from 12 to 18 carbon atoms and is derived from coco, soya, oleyl, etc. origin.

Referring to Table I, Item 12, the alpha-dimethyl-beta-dicoco amino propionaldehyde when employed separately from the cyanoethylated amine salt provided dispersibility slightly under 10% when evaluated according to Socony Mobil Method 530–57, but it was effective as an inhibitor of sludge formation over long storage periods. Comparable results were received in the use of the Armeens and Duomeens set out in column 1, items 13–15 of Table I.

While this invention has been described and exemplified in terms of its preferred embodiments, those skilled in the art will appreciate that variations can be made without departing from the spirit and scope of the invention.

We claim:

1. An improved sludge inhibited fuel oil composition having little tendency to form emulsions, consisting essentially of fuel oil and from about 0.0010 to about 2.0 weight percent of a salt of a cyanoethylated amine having the formula

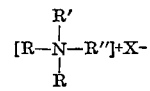

wherein R is an aliphatic hydrocarbon radical having from 8 to 22 carbon atoms; R' is selected from the group consisting of hydrogen, cyanoethyl, lower alkyl radicals having from 1 to 5 carbon atoms, and alkylaryl; R" is selected from the group consisting of lower alkyl radicals having from 1 to 5 carbon atoms, alkylaryl, aryl, cyanoethyl, and radicals represented by the formula

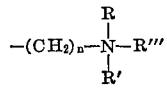

wherein R and R' are as defined above and R''' is selected from the group consisting of aliphatic hydrocarbon radicals having from 1 to 22 carbon atoms, alkyl-aryl, and aryl; and X is an anion.

2. The composition of claim 1 wherein R is an aliphatic hydrocarbon radical having from 12 to 18 carbon atoms.

3. The composition of claim 1 wherein said composition consists essentially of fuel oil and from about 50 to 100 parts per million of said salt.

4. An improved sludge inhibited fuel oil composition having little tendency to form emulsion, consisting essentially of fuel oil and from about 0.0010 to about 2.0 weight percent of a salt of a cyanoethylated amine having the formula

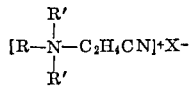

wherein R is an aliphatic hydrocarbon radical having from 8 to 22 carbon atoms; R' is selected from the group consisting of hydrogen, cyanoethyl, lower alkyl radicals having from 1 to 5 carbon atoms, and alkylaryl; and X is an anion.

5. The composition of claim 4 wherein R is an aliphatic hydrocarbon radical having from 12 to 18 carbon atoms.

6. The composition of claim 4 wherein said composition consists essentially of fuel oil and from about 50 to 100 parts per million of said salt.

7. An improved sludge inhibited fuel oil composition having little tendency to form emulsions, consisting essentially of fuel oil and from about 0.0010 to about 2.0 weight percent of N-tallow cyanoethyl amine oleate.

8. An improved sludge inhibited fuel oil composition having little tendency to form emulsions, consisting essentially of fuel oil and from about 0.0010 to about 2.0 weight percent of di-tallow mono-cyanoethyl mono-methyl ammonium sulfate.

9. An improved sludge inhibited fuel oil composition having little tendency to form emulsions, consisting essentially of fuel oil and from about 0.0010 to about 2.0 weight percent of N-tallow cyanoethyl amine palmitate.

10. An improved sludge inhibited fuel oil composition having little tendency to form emulsions, consisting essentially of fuel oil; from about 0.0010 to about 2.0 weight percent of a salt of a cyanoethylated amine having the formula

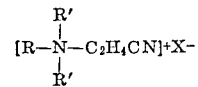

wherein R is an aliphatic hydrocarbon radical having from 8 to 22 carbon atoms, R' is selected from the group consisting of hydrogen, cyanoethyl, lower alkyl radicals having from 1 to 5 carbon atoms, and alkylaryl, and X is an anion; and from about 0.0010 to about 2.0 weight percent of a compound selected from the group consisting of aliphatic tertiary amines, dialiphatic-beta-amino-propionaldehydes, and N-alkyl diamines.

References Cited by the Examiner
UNITED STATES PATENTS 3,115,515  12/1963  Gaul et al. _____ 260—465.5

References Cited by the Applicant
J. Org. Chem. 22, 704–6(1957).

DANIEL E. WYMAN, *Primary Examiner.*

Y. M. HARRIS, *Assistant Examiner.*